United States Patent [19]
Schmitt

[11] Patent Number: 4,748,734
[45] Date of Patent: Jun. 7, 1988

[54] METHOD OF MANUFACTURING STRUCTURAL SUPPORT SHOE

[75] Inventor: Thomas J. Schmitt, Louisville, Ky.

[73] Assignee: Emerson Electric Co., St. Louis, Mo.

[21] Appl. No.: 23,836

[22] Filed: Mar. 9, 1987

Related U.S. Application Data

[62] Division of Ser. No. 895,696, Aug. 12, 1986, Pat. No. 4,694,932.

[51] Int. Cl.[4] .................... B23P 17/00

[52] U.S. Cl. .................... 29/416; 29/150; 29/155 R; 29/437; 29/509; 29/522 R

[58] Field of Search .................... 29/416, 150, 509, 155 R, 29/522.1, 463, 437; 182/109, 108

[56] References Cited

U.S. PATENT DOCUMENTS

| | | | |
|---|---|---|---|
| 656,712 | 8/1900 | Bidle | 29/416 |
| 1,382,833 | 6/1921 | Hurd | 182/108 |
| 1,708,115 | 4/1929 | Baldwin | 29/416 |
| 1,810,923 | 6/1931 | Mooers | 29/463 UX |
| 1,973,226 | 9/1934 | Rose et al. | 182/109 |
| 2,363,972 | 11/1944 | Kellogg | 29/463 UX |
| 2,767,898 | 10/1956 | Cramer | 182/109 |
| 3,034,608 | 5/1962 | Dengler | 29/155 R X |
| 3,037,271 | 6/1962 | Schilberg | 29/416 X |
| 4,415,062 | 11/1983 | Shaw | 182/109 |

FOREIGN PATENT DOCUMENTS

| | | | |
|---|---|---|---|
| 728580 | 11/1942 | Fed. Rep. of Germany | 29/416 |
| 17438 | 9/1967 | Japan | 29/416 |

*Primary Examiner*—Charlie T. Moon
*Attorney, Agent, or Firm*—Polster, Polster and Lucchesi

[57] ABSTRACT

An improved shoe for a structural support and an improved method of forming the same wherein rigid angular parts have the base members positioned in cooperative reinforcing relation and joined together with the side members extending in opposed faced and spaced relation to each other to form the structural shoe.

17 Claims, 1 Drawing Sheet

METHOD OF MANUFACTURING STRUCTURAL SUPPORT SHOE

This is a divisional of copending application Ser. No. 895,696, filed on Aug. 12, 1986, now U.S. Pat. No. 4,694,932.

BACKGROUND OF THE INVENTION

The present invention relates to an improved structural support shoe and method of manufacturing such a shoe and more particularly to an improved shoe structure for a ladder and method of manufacturing the same.

It has been long known in the construction art to pivotally mount shoe members on the feet of structural supports, such as ladders and platforms, to insure a stable base for the support members with which the shoes are associated and to allow for adaptation to some of the varying parameters of terrain environment, such as varying surface contour and material composition. In the past each of the shoe members has been formed as one piece from a suitable rigid material—usually by a known sand casting process—or else have been formed from a single appropriately sized and shaped unit of material which is subsequently turned or bent into a desired configuration.

The present invention recognizes that these past shoe manufacturing operations or processes—whether by sand casting or by shaping and subsequently bending to form—have been comparatively inefficient and expensive in both labor and material costs and that the products thereof have had certain limitations as a consequence of the processes involved.

Recognizing these past problems of manufacture and the limitations of the products produced thereby, the present invention provides a shoe manufacturing process and shoe structure which minimizes labor and material costs, which is straightforward and efficient in operation, maintenance and assembly, requiring a minimum of time and operational steps, and which permits the use of readily producible, ductile and high strength materials in homogeneous form with a minimum of bending stresses and material imperfections.

Various other features of the present invention will become obvious to one skilled in the art upon reading the disclosure set forth herein.

SUMMARY OF THE INVENTION

More particularly, the present invention provides a method of forming a shoe for a structural support comprising: forming a strip of rigid support material to include first and second sections, one of which sections has at least one member thereof extending integrally at a preselected angle from a member of the other section; forming shoe side members from one section and shoe base members from the other section so that each side member is integral with one shoe base member; positioning one base member in cooperative position with respect to another base member with their integral side members in opposed spaced facing relation; and, joining the base members together in reinforced relation to form the shoe. In addition, the present invention provides a shoe for a structural support comprising: a pair of rigid angular parts, each including a base member and a side member extending integrally therefrom at an angle thereto; the base member of one part being positioned in cooperative relation with respect to the base member of the other part with the side members of each part extending in opposed facing spaced relation to each other; and, means to join the base members in fast reinforcing relation to form a shoe support.

It is to be understood that various changes can be made by one skilled in the art in one or more of the several steps of the inventive method disclosed herein or in one or more of the several parts of the inventive apparatus disclosed herein without departing from the scope or spirit of the present invention.

BRIEF DESCRIPTION OF THE DRAWING

Referring to the drawing which discloses an advantageous embodiment of the present invention and a modification thereof.

DETAILED DESCRIPTION OF THE DRAWING

Figure 1:
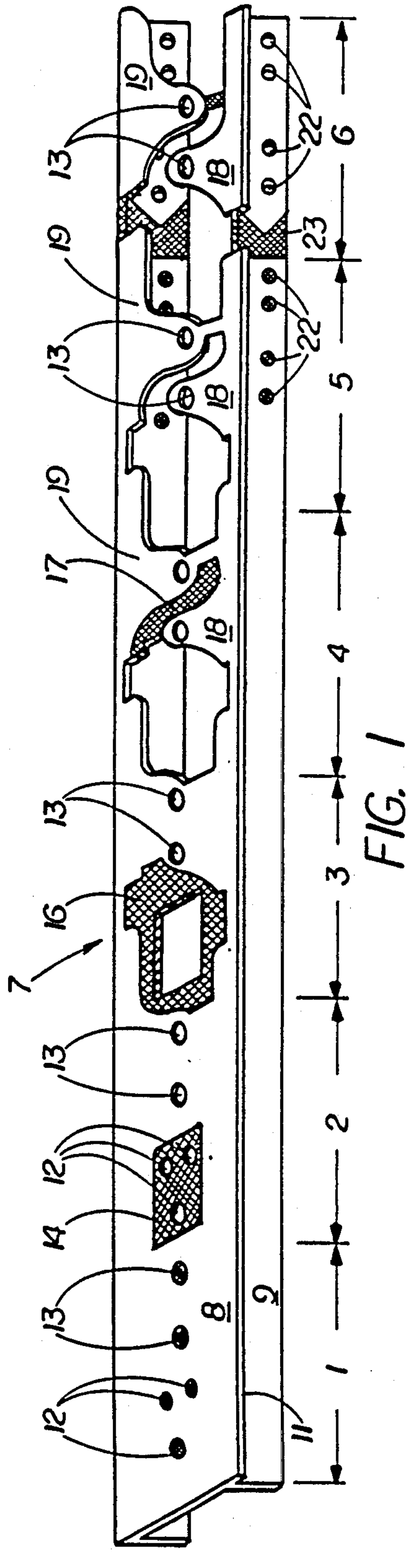
FIG. 1 is an isometric view of an extruded strip of material, illustrating schematically and by cross-hatched lines the several steps of the inventive method.

Referring to FIG. 1 of the drawing, the several steps of the inventive method involved in forming the inventive shoe for a structural support, such as a ladder, are identified by reference numerals 1 through 6, these steps being illustrated by cross-hatching in conjunction with a lineal strip 7 which can be of a suitably rigid, extruded aluminum material that can be extruded by any one of a number of known extrusion methods (not disclosed herein).

In the embodiment of FIG. 1, extruded lineal strip 7 is shown in channel form, having a U-shaped cross-section of uniform thickness with the material at base 8 of the strip 7 serving as a first section of the strip and the material in the opposed, downturned legs 9 of the strip 7 serving as a second section of the strip. In the embodiment disclosed, downturned legs 9 are illustrated as being substantially perpendicular or normal to base 8. It is to be understood that other angles can be employed between base and legs, if desired and, in fact, other shapes of differing geometric cross-section besides the U-shaped cross-section illustrated can be utilized. For example, it would be possible to extrude strips of right angle shapes in carrying out the present invention. Further, in the embodiment of FIG. 1, it is to be noted that strip 7 is so extruded that base leg 8 overlaps one of the two spaced opposed legs 9 an amount equal to the thickness of the material. The purpose of this overlap, designated by reference numeral 11, will become more evident hereinafter.

In carrying out the inventive method described hereinafter, it also is to be understood that any one of several suitable metal forming machines can be selectively used to accomplish each of the several different steps of the described method and that any one of several well known and appropriate conveying mechanisms can be utilized to move extruded strip 7 with its legs 9 extending in a downward position from one metal working station to another. For example, instead of punching and stamping machinery, it would be possible to utilize laser equipment for metal formation. Accordingly, the specific machinery used to accomplish each described step is not disclosed in the drawings for purposes of clarity and brevity.

In step 1 of the inventive method, hole sets 12 and 13 as represented by the cross-hatching are formed or punched out by an appropriate machine in the first section or base 8 of lineal extruded strip 7. These hole sets are preselectively sized and spaced so that certain of the holes, namely holes 13, will be included in the side members of the inventive shoe as described hereinafter and certain of the holes, namely holes 12, will be included in a reinforcing plate formed from intermediate otherwise waste material, as also is described hereinafter.

Once holes 12 and 13 are formed in base 8, strip 7 is conveyed to station 2. At this station, a reinforcement plate 14, as represented by the cross-hatching which incorporates the punched holes 12, is formed or stamped out from the first section or base 8 of extruded strip 7. It is to be understood that this stamping of reinforcement plate 14 is accomplished to utilize otherwise waste materials in strip 7 for other purposes and that other shapes or parts can be formed or stamped as might be permitted by the geometry of remaining material which would be otherwise designated as waste.

Strip 7 is then moved from station 2 to stations 3 and 4 where a first portion 16, as represented by cross-hatching, at station 3 and a second portion 17, as represented by cross-hatching, at station 4 are formed or stamped out to form the right side 18 and left side 19 of a support shoe to be described more fully hereinafter. It is to be noted that each shoe side 18 and 19 incorporates one of the holes 13 at the apex thereof and that a carrying strip 21 remains between the right and left shoes.

Strip 7 is then moved to station 5 where opposed downwardly extending legs 9 are formed or punched, as represented by the cross-hatching, to provide four spaced holes 22 in each leg 9 of strip 7. Strip 7 is then finally moved to station 6 where portions 23, as represented by the cross-hatching, are formed or stamped out from each leg 9 of strip 7 to form spikes 24 and 26 and to complete the right and left shoe base members 27 and 28 integral with the aforedescribed right and left hand shoe sides 18 and 19, respectively, and extending at substantially right angles therefrom. Also, at station 6, the carrying strip 21 between shoe sides 17 and 18, as represented by the cross-hatching, is formed or stamped out to free the completed right and left hand parts.

Figure 3:
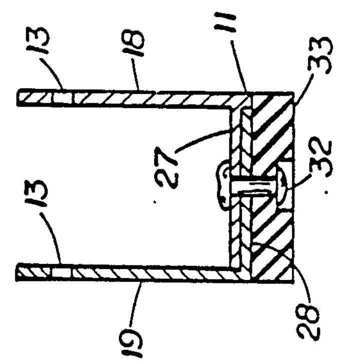
FIG. 3 is a cross-sectional view of a portion of the shoe taken in a plane through line 3—3 of FIG. 2; and, FIG. 4 is a cross-sectional view similar to FIG. 3 of a modified shoe arrangement formed in accordance with the present invention.
Figure 2:
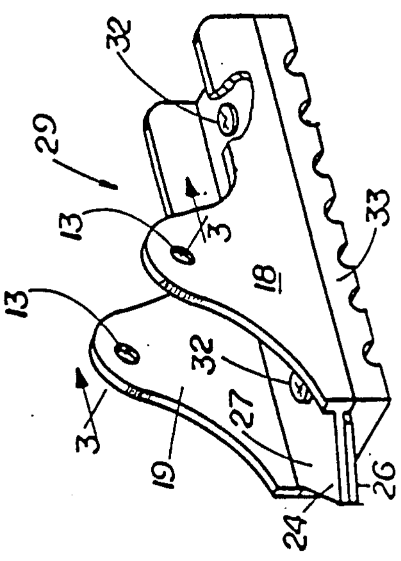
FIG. 2 is an enlarged isometric view of an inventive shoe formed by the method illustrated in FIG. 1.

As can be seen in FIGS. 2 and 3 of the drawings, these parts are subsequently positioned relative each other so that left hand shoe base 28 is overlapped and reinforced by right hand shoe base 27 and spike 24 overlaps and reinforces spike 26 with the punched holes 22 in mating aligned relation and with the edge extremity of shoe 27 abutting overlap 11 extending from what has now been stamped as right hand shoe 18.

With the holes 22 in overlapping bases 27 and 28 in aligned position and the right and left sides 18 and 19 in spaced opposed relation with their spaced, opposed holes 13 in alignment, the bases can then be joined to form final shoe support member 29 having a strengthened spike and base and without undue stress or concern about heretofore known casting voids.

Any one of several fastening arrangements, such as rivets of the semi-tubular or self-piercing type can be utilized, as well as spot welding or staking. In the embodiment of FIG. 3, rivets 32 are disclosed, these rivets serving to fasten both overlapping shoe base members 27 and 28 and a suitable strip of traction material 33, such as hard rubber, to the lower face of base 28 to hold the shoe firmly in assembled relation.

Figure 4:
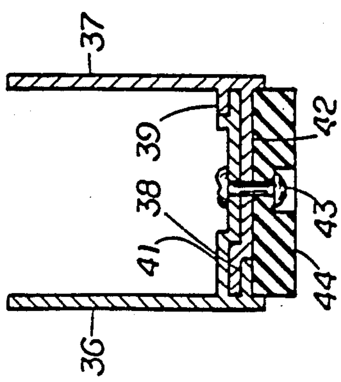

Referring to FIG. 4 of the drawings, a shoe manufactured in accordance with the abovedescribed process is disclosed, the shoe being manufactured from a modified extrusion, each of the opposed shoe sides 36 and 37 having a short shoe base 38 and 39 respectively extending therefrom at substantially right angles thereto, the short base 38 being in offset relation to short base 39. In addition, each of the opposed shoe sides 36 and 37 has a long shoe base 41 and 42 respectively extending therefrom, the long shoe bases 41 and 42 including integrally offset portions. From FIG. 4, it can be seen that when shoe bases 41 and 42 are positioned in overlapped position, the offset relations of the several parts permit for base interlocking or dovetailing. As before described, a suitable fastening means such as one of several rivets 43 can be used to firmly hold the overlapping, interlocked bases 41 and 42 together along with an appropriate rubber shoe tread 44.

From the abovedescribed method and apparatus, it can be seen that various changes can be made by one skilled in the art in any one of the several described steps or in any one of the several parts without departing from the present invention. For example, instead of extruded aluminum, it would be possible to form a shoe from a tough extruded plastic. Further, as abovementioned, the geometry of the extruded shapes could be altered as could the machinery to do the desired metal forming and it would be possible to vary the geometry of the shoe bases to permit other dovetailing arrangements.

The invention claimed is:

1. A method of forming a shoe for a structural support comprising:
   - forming a strip of rigid support material to include first and second sections, one of which sections has at least one member thereof extending integrally at a preselected angle from a member of the other section;
   - cutting shoe side members from one section and shoe base members from the other seection so that each side member is integral with one shoe base member;
   - positioning one base member in cooperative position with respect to another base member with their integral side members in opposed spaced facing relation; and,
   - joining said base members together in reinforcing relation to form said shoe.

2. The method of forming a shoe of claim 1, said base members being cooperatively positioned in overlapping relation.

3. The method of forming a shoe of claim 1, said strip being an extruded material.

4. The method of forming a shoe of claim 1, said strip being an extruded aluminum material.

5. The method of forming a shoe of claim 1, and forming holes in predetermined selectively spaced patterns in said first and second sections of said strip, with certain of said holes to be included in said shoe side members and certain of said holes to be included in said shoe base members.

6. The method of forming a shoe of claim 1, and cutting other structural forms from said sections of said strip intermediate said shoe members.

7. The method of forming a shoe of claim 1, said base members being joined by riveting.

8. The method of forming a shoe of claim 1, said base members being joined by welding.

9. The method of forming a shoe of claim 1, said base members being joined by staking.

10. The method of forming a shoe of claim 1, one section of said strip from which said base members are formed including offset portions to be interlocked with offset portions of said other base member with which it is joined.

11. The method of forming a shoe of claim 1, said strip being formed to be of substantially U-shaped cross-section with the material at the base of said U in said strip serving as said first section and the material in the opposed legs of said U in said strip extending integrally therefrom serving as said second section.

12. The method of forming a shoe of claim 1, said strip being formed to be of substantially U-shaped cross-section with the material at the base of said U in said strip serving as said first section from which right and left hand side members are cut in a dovetailing scroll pattern and the material in the opposed legs of said U in said strip serving as said second section from which said base members are cut to be integral with said right and left hand side members respectively.

13. The method of forming a shoe of claim 12, and forming holes in predetermined selectively spaced patterns in said first and second sections of said strip with certain of said holes to be included in said shoe side members and certain of said holes to be included in said shoe base members.

14. The method of forming a shoe of claim 12, and forming holes in predetermined selectively spaced patterns in said first section in the area between that which is to serve as right and left hand side members; and, cutting said area in a preselected design for use elsewhere.

15. The method of forming a shoe of claim 12, wherein said right and left hand side members are cut in two successive steps with a carrying strip remaining therebetween, and said carrying strip being cut out as a final operation.

16. The method of forming a shoe of claim 12, wherein pointed spikes are cut at one extremity of said base members.

17. The method of forming a shoe for the foot of a ladder comprising:

extruding a lineal U-shaped channel strip of uniform thickness from integral rigid aluminum material with the material at the base of said U in said strip serving as a first section in said strip and the material in the opposed legs of said U in said strip extending substantially normal to said base serving as a second section in said strip and with said base overlapping one leg an amount equal to the thickness of the material;

punching holes in predetermined selectively spaced patterns in said first section of said strip with certain of said holes to be included in side members to be stamped in dovetailed scrolled fashion from said first section and certain of said holes to be included in a structural reinforcing plate to be stamped from said first section from material between said dovetailed side members;

stamping and removing said structural plate from said first section;

stamping and removing one portion of said right and left shoe side members from said first section;

stamping and removing a second portion of said right and left shoe side members from said first section with a carrying strip remaining therebetween;

punching holes in predetermined selectively spaced patterns in said second section of said strip to be included in the shoe base members to be stamped from the opposed legs of said second section;

stamping out the opposed legs of said second section to form right and left hand shoe base members integrally connected and extending respectively at right angles from the right and left hand shoe side members stamped in dovetail fashion from said first section of said strip, said leg stamping operation serving to separate successive right hand and left hand legs in the strip and designed to form spikes at one end of each of the shoe base members formed from said legs;

stamping and removing the carrying strip between right and left hand shoe side members;

positioning said right and left hand shoe base members stamped from said second section in overlapping position with the edge of one shoe base member adjacent said portion of said first section overlapping one leg of said second section and said right and left hand shoe side members stamped from said first section of said strip in spaced opposed relation and with the punched holes in said overlapped base members in mating relation;

covering the outside face of said overlapped base members with a strip of traction material; and, rivet fastening said overlapped base members and traction material together to form said ladder shoe.

* * * * *